United States Patent [19]
Maeda

[11] Patent Number: 4,896,710
[45] Date of Patent: Jan. 30, 1990

[54] PNEUMATIC RADIAL TIRES FOR HEAVY VEHICLES

[75] Inventor: Kietsu Maeda, Toyonaka, Japan

[73] Assignee: Toyo Tire & Rubber Co., Ltd., Osaka, Japan

[21] Appl. No.: 290,193

[22] Filed: Dec. 27, 1988

[30] Foreign Application Priority Data

Dec. 28, 1987 [JP] Japan .................. 62-334632

[51] Int. Cl.$^4$ .................. B60C 9/02; D02G 3/48
[52] U.S. Cl. .................. 152/556; 152/451; 152/557
[58] Field of Search .............. 152/451, 527, 548, 556, 152/563, 557; 57/902

[56] References Cited

U.S. PATENT DOCUMENTS

Re. 29,382  9/1977  Fontijn .................. 428/264 X
3,851,692  12/1974  Takemura et al. .......... 152/556 X
4,350,006  9/1982  Okamoto et al. ........... 264/172 X

FOREIGN PATENT DOCUMENTS 56-140128  11/1981  Japan .

Primary Examiner—Raymond Hoch
Attorney, Agent, or Firm—Wenderoth, Lind & Ponack

[57] ABSTRACT

Pneumatic radial tires for load vehicles include carcass plies reinforced with composite twisted filaments having a core-sheath structure, the core being made of polyester and the sheath being made of polyamide. The sheath accounts for 40–60 wt % of the entire core-sheath structure, and the coefficient of twist K of the cords satisfies the condition $1.22 < K < 2.24$ and the initial modulus Md (g/d) of the cords satisfies the condition $Md > 45.0$.

1 Claim, 2 Drawing Sheets

PNEUMATIC RADIAL TIRES FOR HEAVY VEHICLES

BACKGROUND OF THE INVENTION

1. Field of the Invention

This invention relates to pneumatic radial tires for heavy vehicles and more particularly to improving the heat resistance and durability of pneumatic radial tires used at high speeds under heavy loads.

2. Description of the Related Art

In recent years there has been an increasing tendency to use radial tires in high-performance vehicles due to improved road conditions. This tendency can also be attributed to the coincidental social demand for conserving energy and the cost savings associated therewith. The desirability of cost savings naturally has led to the demand for lightweight tires. For achieving this end, tires have been developed employing polyester cords as reinforcing materials instead of steel cords. Furthermore, radial tires employing reinforcing cords made of aromatic polyamide fibers such as Kevlar manufactured by DuPont have also been recently commercially developed. The tires employing the above-described reinforcing cords can be inflated to a high pressure and can safely maintain such a high inflation pressure.

However, the molecular structure of the aforesaid aromatic polyamide fibers is so highly oriented that their adhesion to other materials is poor and their resistance to flexing is inferior. When the aromatic polyamide fibers are used as a carcass of ply cords in a tire, then there is a tendency for an abrupt deterioration of the durability of the tire, in that the tire tends to separate or burst during service. On the other hand, when polyester cords are used as a carcass of ply cords, then the problems associated with aromatic polyamide fibers do not occur, but other problems arise such as the polyester tending to be decomposed by water and amine components contained in rubber. Therefore, polyester cords are not suitable for use as carcass of plies in a tire subjected to severe operating conditions. While there has been an increasing need for pneumatic radial tires for heavy vehicles which can be used under severe conditions such as at high speed, under a heavy load and during long distance travel, actual conditions under which tires are used are becoming severer.

SUMMARY OF THE INVENTION

It is therefore an object of the present invention to provide pneumatic radial tires for heavy vehicles in which problems caused by polyester cords employed as reinforcing materials are obviated and which are relatively light while exhibiting relatively high heat resistance and durability.

In order to accomplish the objects above, the present inventor has developed carcass ply cord materials having the characteristics of nylon fibers so as to be highly resistant to heat and of polyester fibers having a high initial modulus and more specifically, has developed composite filaments having a core-sheath structure in which the core is made of polyester and the sheath is made of polyamide.

In addition, the present invention provides pneumatic radial tires for heaving vehicles comprising a tread portion, a pair of sidewall portions extending from both sides of said tread portion, respectively, and a pair of bead portions extending radially inwardly from the sidewall portions, respectively, and reinforced with a carcass of plies comprising carcass ply cords extending in the radial direction of the tire and belt cord layers covering the carcass plies under the tread portion, wherein said carcass ply cords comprise twisted composite filaments having a core-sheath structure in which the core is made of polyester and the sheath is made of polyamide and the sheath accounts for 40–60 wt % of the entire core-sheath structure, and a coefficient of twist K of the carcass ply cords is defined by the following equation, $$K = T\sqrt{\frac{D}{\rho}} \times 10^{-3}$$

wherein T is the number of twists per 10 cm length,
D is the total denier of cord and
$\rho$ is the specific gravity of cord, the coefficient K being within the range of
$1.22 < K < 2.24$
and wherein properties of the carcass ply cords satisfy the following condition,
$Md > 45.0$
wherein Md is the initial modulus (g/d) obtained from the load required for 2% elongation of the cords at room temperature.

In the present invention, the polyester of the core of the composite filaments having a core-sheath structure refers to a polyester whose main repeating unit is ethylene terephthalate and therefore polyethylene terephthalate is the preferred polyester to be used. So far as the main property of the polyester is not impaired, a copolymer with any other copolymerizable monomer may be used.

On the other hand, the polyamide of the sheath of the composite filaments of a core-sheath structure is a fiber-forming polyamide obtained from polymerizable diamine and dicarboxylic acid, monoamino carboxylic acid or amide-forming derivatives thereof. Copolymer composed of two or more of the above-described substances may also be employed.

Other high modulus fibers include rayon, vinylon, and Kevlar (aromatic polyamide manufactured by DuPont) fibers. Rayon, however, has lower strength and it is therefore necessary to increase the cord end counts and the number of plies in order to maintain the factor of safety of the tire; vinylon has lower fatigue resistance as compared with the composite filaments of the present invention; Kevlar is inferior with respect to its adhesive properties and fatigue resistance, and therefore is not preferable in practical use.

In the present invention, the sheath comprising polyamide accounts for 40–60 wt % of the entire core-sheath structure. The reason for this is that if polyamide is less than 40 wt %, the heat resistance of the tire is not improved sufficiently and accordingly, pneumatic radial tires having improved heat resistance cannot be provided which is one of the objects of the present invention. On the other hand, if polyamide accounts for over 60 wt %, heat resistance is improved but the high modulus property associated with polyester is diminished (cf. FIG. 2), which results in lower dimensional stability and deterioration of the uniformity of the structure; furthermore, a large amount of creep occurs in the cords and the strain in the vicinity of the belt edges of the radial tire is increased thereby deteriorating tire durability.

The coefficient of twist K of the carcass ply cords in accordance with the present invention is within the range of $1.22 < K < 2.24$. The reason for this is that if K is less than 1.22, then fatigue resistance is inferior, and if K is over 2.24, then the cord strength is reduced and the cord modulus is reduced, i.e. a large amount of creep can occur resulting in the deterioration of tire durability.

The initial modulus Md of the carcass ply cords in accordance with the present invention satisfies the condition, $Md > 45.0$.

As a result, pneumatic radial tires for heavy vehicles are provided which are of light and have improved properties such as heat resistance, uniformity, fatigue resistance, and durability.

DETAILED DESCRIPTION OF THE PREFERRED EMBODIMENTS

The present invention will now be described referring to preferred embodiments and comparative examples.

Figure 1:
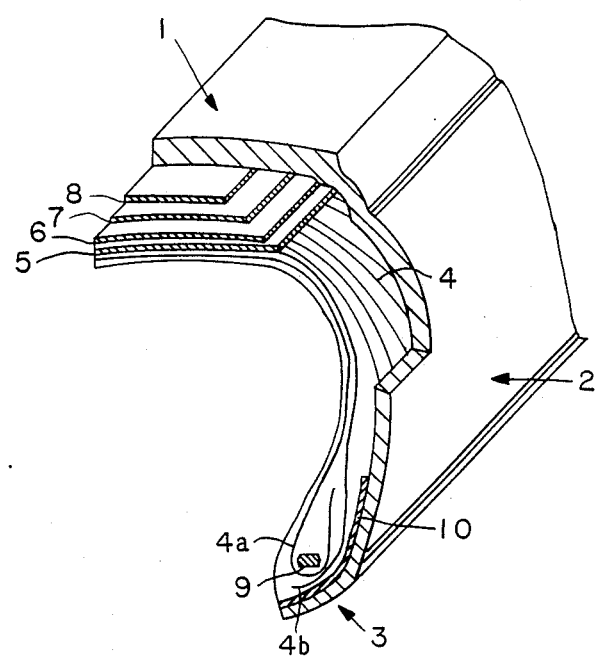
FIG. 1 is a partially broken-away perspective view of a preferred embodiment of a pneumatic radial tire for heavy vehicles in accordance with the present invention.

Radial tire of 10.00 R 20 14PR as shown in FIG. 1 were prepared, which include five embodiments discussed by way of six comparative examples. Said tires were reinforced with a carcass of plies including fiber cords, as shown in Table 1 and with four steel belt layers each comprising cords crossed with the cords in adjacent layers.

Referring to FIG. 1, numeral 1 denotes a tread portion, numeral 2 denotes one of a pair of sidewall portions extending from a side of said tread portion 1, numeral 3 denotes one of a pair of bead portions extending radially inwardly from the sidewall portion 2. Numeral 4 denotes carcass plies having ply cords extending in the radial direction of the tire. In this exemplary tire construction, the carcass plies 4 are composed of two inner carcass plies 4a and two outer carcass plies 4b. Numerals 5, 6, 7 and 8 represent steel belt cord layers which cover the carcass plies 4 under the tread portion 1. Numeral 9 denotes a bead wire and reference numeral 10 denotes a chafer.

While a tire including one carcass ply of steel cords is employed in a Comparative Example 6, in each of Embodiments 1-5 and Comparative Examples 1-5 a tire includes carcass plies having a two up-two down structure in which two inner carcass plies extend around the bead wire 9 from the inside to the outside of the tire and two outer carcass plies extend around the bead wire and terminate radially inwardly of the bead wire.

Comparative Example 1 is a control in which four rubberized fabrics comprising polyethylene terephthalate (PET) cords are employed as carcass plies disposed in a two up-two down structure and said polyester cords are of 1500 d/2 with the number of twist being 40×40 per 10 cm as 40 turns for strand twisting to form a cord. Cord end counts are the same throughout Embodiments 1-5 and Comparative Examples 1-6.

In Embodiments 1-5 and Comparative Examples 2-5, the carcass cords comprise composite filaments having a coresheath structure, the core being PET and the sheath being Nylon 66 (NY66).

While the present invention has been described in its preferred embodiments, it is to be understood that the present invention may employ any other polyesters and polyamides.

Table 1 indicates test results derived from tests conducted as follows.

(1) Initial modulus Md

Cords were elongated by using an autograph apparatus at a room temperature of 23±2° C. in accordance with JIS L-1017, then the initial modulus (g/d) was obtained from the tension load at 2% elongation of cords.

(2) Index of tire safety

The value was indicated in the form of an index by setting the carcass strength [cord strength x cord end counts (counts/5 cm)×number of plies] of Comparative Example 1 to be 100. The steel ply tire in Comparative Example 6 was given a high index taking the wear of tire during tire service into consideration.

(3) Tire weight

The value was indicated in the form of an index by setting the weight of the polyester tire (comparative example 1) to be 100.

(4) Uniformity

Tires were rotated under a given inflation pressure and a load in accordance with JIS D-4202. The value of the power variation in the radial direction of the tires was measured and assigned ratings from 1 to 5, 5 being the most preferable.

(5) Drum life

Drum tests were conducted in accordance with test conditions specified in section 119 of FMVSS. The test results were indicated showing the running hours at a specified speed up until the time when tire failure occurred.

As is apparent from Table 4, the core (PET)/sheath (NY66) ratio in Comparative Example 2 is higher than permitted by the invention, and no improvement in heat resistance is observed. In Comparative Example 3, the core (PET)/sheath (NY66) ratio is low and the cord modulus is reduced thereby contributing to a lowered drum life. On the other hand, in Embodiment 2 the core (PET)/sheath (NY66) ratio is within a preferable range, thereby contributing to an improved drum life. In Comparative Example 4, the coefficient of twist of cords is lower than permitted by the invention, and the drum life is reduced by one rank but the drum life of Embodiment 3 is not lower with the coefficient of twist over the lower limit 1.22. On the other hand, in Comparative Example 5, the coefficient of twist is higher than the upper limit 2.24, so that the cord modulus is lower, thus contributing to lower drum life.

Thus, as apparent from Embodiments 1-5, when the core (PET)/sheath (NY66) ratio of composite filaments having a core-sheath structure and the coefficient of twist of the cord are arranged within a given range which has been described above, the drum life is improved.

Figure 2:
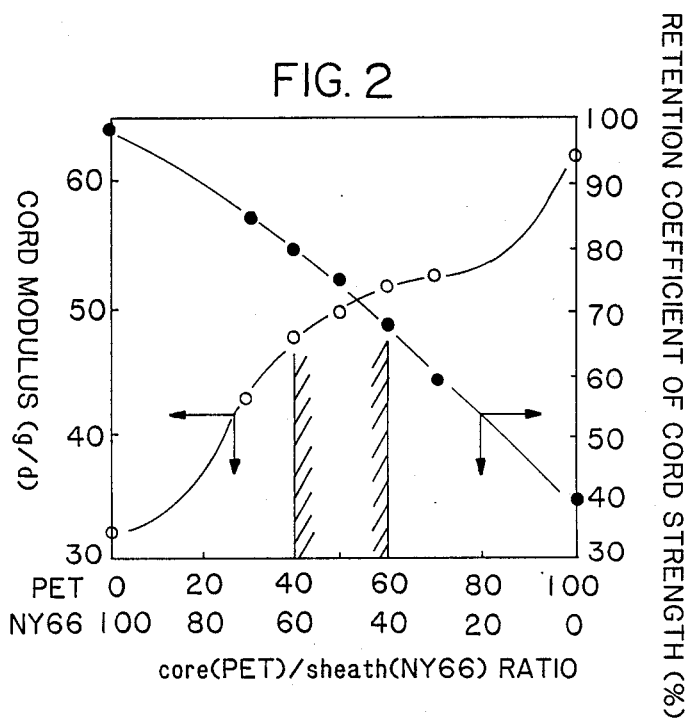
FIG. 2 is a graph illustrating the relation among the core/sheath ratio of composite filaments and the cord modulus and the retention coefficient of cord strength after heat aging.

Additionally, FIG. 2 shows the relation among the core (PET)/sheath (NY66) ratio of composite filaments having a core-sheath structure and the cord modulus and the retention coefficient of cord strength. In the cord employed, the cord structure is 1500 d/2 and the number of twist is 40×40 (T/10 cm). The retention coefficient of cord strength(%) was obtained from the fatigue resistance of the cord embedded in rubber after aging at 170° C. for three hours, and thus the retention coefficient of cord strength represents the heat resistance of the cord. It can be seen from FIG. 2 that when the core (PET)/sheath (NY66) ratio is within a range of 40–60%, both the cord modulus and the heat resistance are satisfactory.

Figure 3:
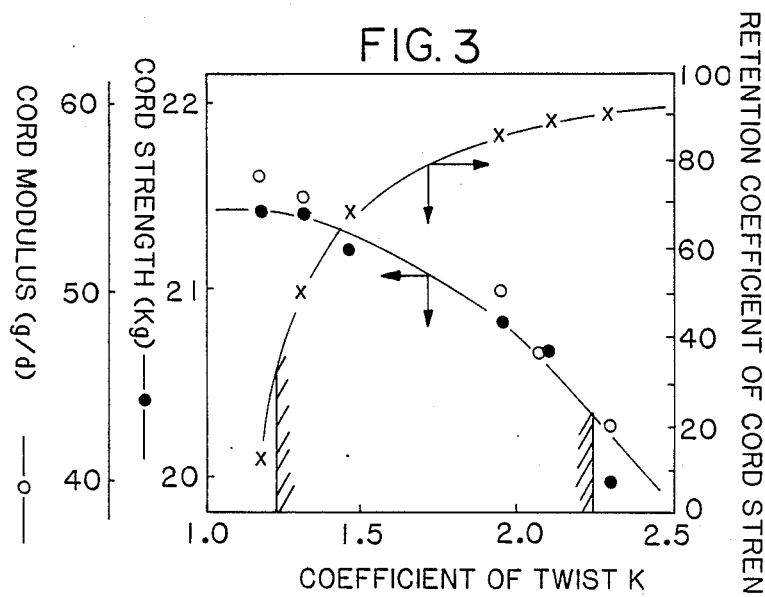
FIG. 3 is a graph illustrating the relation among the coefficient of twist, the cord strength, cord modulus and the retention coefficient of cord strength when the core/sheath ratio is 50/50.

FIG. 3 is a graph illustrating the relation between the coefficient of twist K and cord properties when the core (PET)/sheath (NY66) ratio is 50/50. In this case, the cord structure is 1500 d/2, and cord properties such as cord strength (Kg), cord modulus (g/d) and the retention coefficient of cord strength (%) which represents fatigue resistance after a disc type fatigue test were measured. The disc type test was conducted under the conditions of $1.08 \times 10$ cycles with increase of $+6/-12.5\%$.

As shown in FIG. 3, when the coefficient of twist K is within the range of 1.22 to 2.24, preferable results are observed.

Thus, the present invention can provide pneumatic radial tires for heavy vehicles which are of light compared with steel ply tires and at the same time have superior heat resistance and durability as compared with tires reinforced with polyamide or polyester carcass plies.

TABLE 1

| | EMBODIMENTS | | | | | COMPARATIVE EXAMPLES | | | | | |
|---|---|---|---|---|---|---|---|---|---|---|---|
| | 1 | 2 | 3 | 4 | 5 | 1 | 2 | 3 | 4 | 5 | 6 |
| Tire size | 10.00 R 20 14 PR | | | | | | | | | | |
| Cord material | | | | | | | | | | | |
| A: polyester | | | | | | | | | | | |
| B: composite filaments of a core-sheath structure C: steel | B | B | B | B | B | A | B | B | B | B | C |
| core(PET)/sheath(NY66) ratio | 60/40 | 40/60 | 50/50 | 50/50 | 50/50 | — | 70/30 | 30/70 | 50/50 | 50/50 | — |
| Cord structure | 1500d/2 | 1500d/2 | 1500d/2 | 1500d/2 | 1500/d | 1500d/2 | 1500d/2 | 1500d/2 | 1500d/2 | 1500d/2 | 7 × 4 × 0.75 + 1 |
| Number of twist (T/10 cm) | 39 × 39 | 39 × 39 | 27 × 27 | 43 × 43 | 40 × 40 | 40 × 40 | 39 × 39 | 39 × 39 | 24 × 24 | 47 × 47 | — |
| Coefficient of twist K | 1.90 | 1.93 | 1.32 | 2.11 | 1.96 | 1.87 | 1.87 | 1.95 | 1.18 | 2.30 | — |
| Initial modulus Md | 52 | 48 | 55 | 47 | 50 | 62 | 53 | 43 | 56 | 43 | 210 |
| Cord strength (Kg/counts) | 20.8 | 21.0 | 21.4 | 20.7 | 20.9 | 21.0 | 20.0 | 21.0 | 21.4 | 20.0 | 175 |
| Tire safety (Index) | 99 | 100 | 102 | 99 | 100 | 100 | 96 | 100 | 102 | 95 | 114 |
| Tire weight (Index) | 100 | 100 | 100 | 100 | 100 | 100 | 100 | 100 | 100 | 100 | 120 |
| Uniformity (Rating) | 5 | 4.5 | 5 | 4.5 | 5 | 5 | 5 | 3.5 | 5 | 3.5 | 5 |
| Drum life | | | | | | | | | | | |
| Speed (Km/h) | 112 | 112 | 104 | 112 | 112 | 104 | 104 | 88 | 96 | 88 | 104 |
| Hours | 7.0 | 7.5 | 9.5 | 8.5 | 9.2 | 4.5 | 5.5 | 10.0 | 9.5 | 10.5 | 5.0 |

I claim:

1. A pneumatic radial tire comprising:

an outer covering including a tread portion extending along the outer circumference of the tire, a respective sidewall portion extending from each side of said tread portion, and a respective bead portion extending radially inwardly from each said sidewall portion; and a carcass comprising carcass plies and belt cord layers disposed beneath said outer covering and reinforcing the same, said carcass plies including carcass ply cords extending radially in the tire, and said belt cord layers interposed between said tread portion and said carcass plies, each of said carcass ply cords comprising a twisted composite filament having a core-sheath structure in which a core is surrounded by a sheath, said core comprising polyester, and said sheath comprising polyamide and accounting for 40–60 wt % of the entire said core-sheath structure, each of said carcass ply cords that comprises the twisted composite filament having a coefficient of twist K defined by $$K = T\sqrt{\frac{D}{\rho}} \times 10^{-3}$$

wherein T is the number of twists per 10 cm of cord length,

D is the denier of the cord, and $\rho$ is the specific gravity of the cord and the coefficient of twist K being within the range of $1.22 < K < 2.24$, and each of said carcass ply cords having an initial modulus Md (g/d) based on the load required to elongate the cord 2% at room temperature satisfying the condition $Md > 45.0$.

* * * * *